United States Patent [19]

Brock

[11] 4,222,498
[45] Sep. 16, 1980

[54] CONTROL SYSTEM FOR AGGREGATE DELIVERY SYSTEM
[75] Inventor: James D. Brock, Chattanooga, Tenn.
[73] Assignee: Astec Industries, Inc., Chattanooga, Tenn.
[21] Appl. No.: 4,040
[22] Filed: Jan. 17, 1979
[51] Int. Cl.³ .............................................. B28C 7/04
[52] U.S. Cl. .................................... 222/58; 222/63; 222/135; 366/8
[58] Field of Search ................ 366/8; 222/58, 63, 77, 222/135, 144.5

[56] References Cited
U.S. PATENT DOCUMENTS

| 2,658,644 | 11/1953 | Lowe | 222/58 X |
|---|---|---|---|
| 2,982,445 | 5/1961 | Koble | 222/63 X |
| 3,107,820 | 10/1963 | Turner | 222/58 |
| 4,089,509 | 5/1978 | Morton et al. | 366/8 |
| 4,111,336 | 9/1978 | Ward et al. | 222/58 |

Primary Examiner—David A. Scherbel
Attorney, Agent, or Firm—Jones, Thomas & Askew

[57] ABSTRACT

Apparatus for measuring out material from a cold feed bin for use with a drum mix plant. The apparatus comprises a plurality of cold feed bins supported on a plurality of legs above a frame. Each leg of the bins rests upon a load cell which thereby measure the weight of the bin and material contained therein. Control circuitry connected to the load cells regulates belt feeders disposed below each bin which adjust the rate at which material is dispensed from each bin in response to the weight measured by the load cells to maintain a desired rate of weight reduction. A belt conveyor disposed below the belt feeders transports the dispensed material to the input of a mixing plant.

2 Claims, 5 Drawing Figures

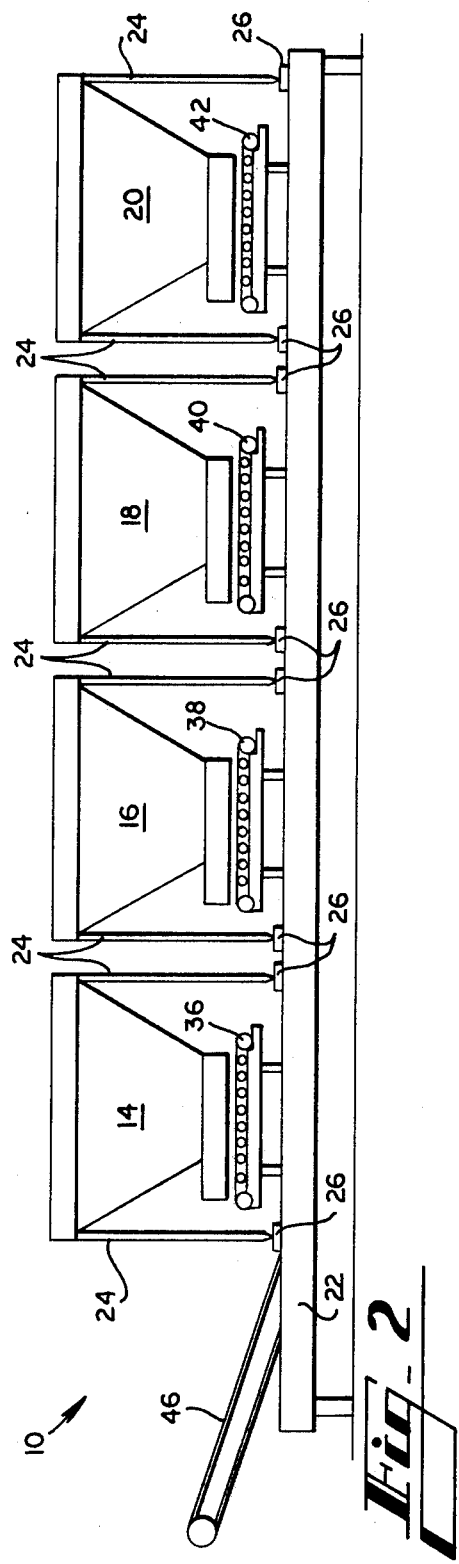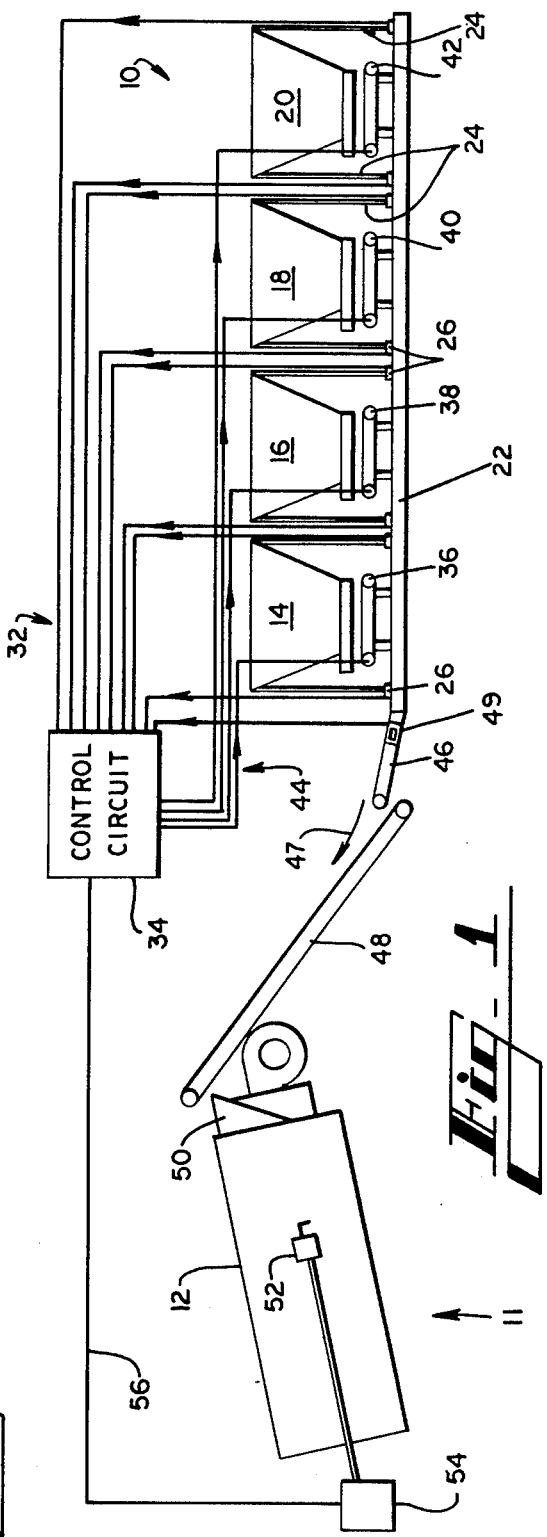

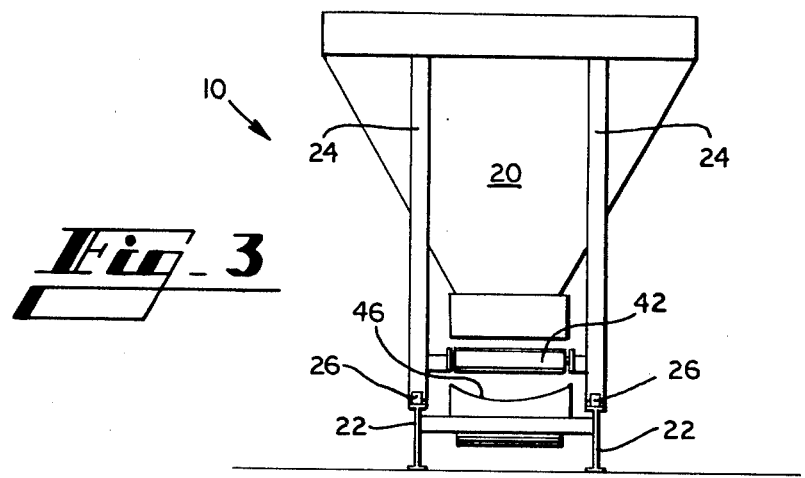
Fig_3
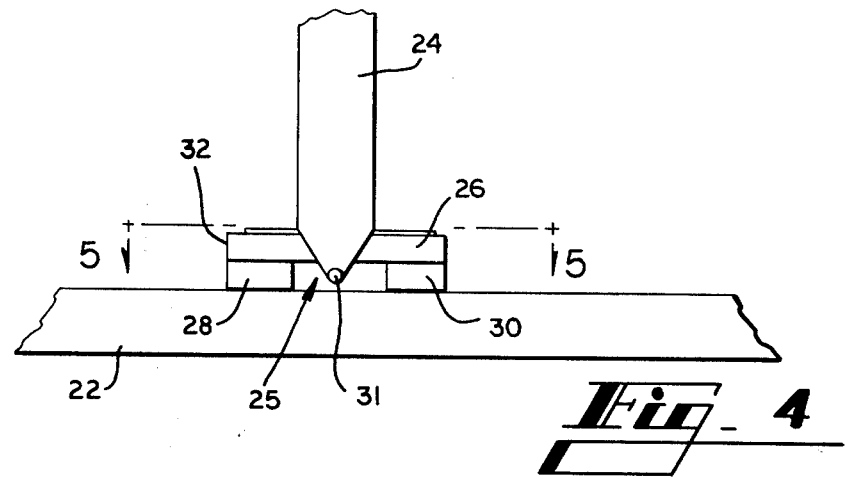
Fig_4
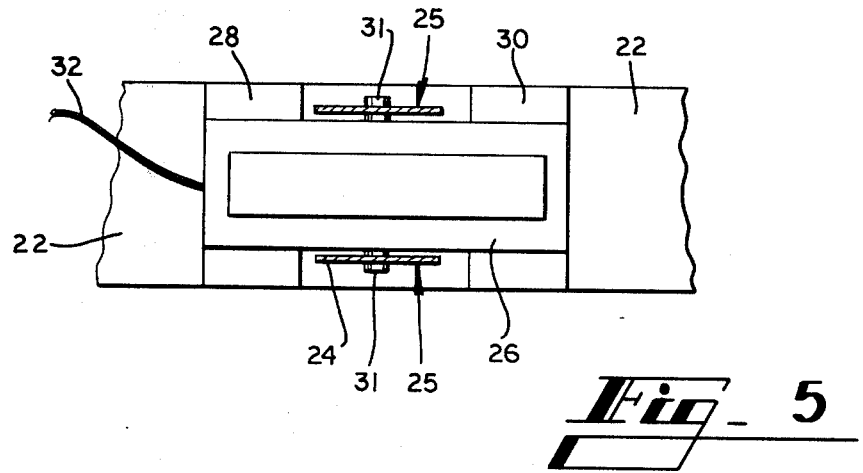
Fig_5

CONTROL SYSTEM FOR AGGREGATE DELIVERY SYSTEM

TECHNICAL FIELD

The present invention relates generally to an aggregate delivery apparatus used in association with asphalt plants, such as drum mix asphalt plants.

A drum mix asphalt plant is an apparatus which processes various raw materials to produce an asphalt-aggregate product. A drum mix plant typically comprises an inclined rotating drum having a fuel fired burner disposed at one end thereof for projecting a flame and hot combustion gases into the drum. Virgin aggregate of various grades or a combination of virgin aggregate and used asphalt-aggregate material is introduced at the upper end of the rotating drum, whereupon the material is heated and mixed within the drum. While the aggregate materials are being processed in the drum liquid asphalt is added to the aggregate material, preferably being dispensed from a nozzle at a point within the drum intermediate the ends of the drum, to coat the aggregate material and provide a finished asphalt-aggregate material product when removed from the lower end of the drum. In order to insure uniformity in the grade or properties of the finished asphalt-aggregate material, it is necessary to accurately control the proportions of the aggregate materials introduced at the upper end of the drum.

Aggregate must similarly be delivered in correct proportions to other types of asphalt plants, such as batch plants.

BACKGROUND OF THE INVENTION

Before being delivered to the mixing apparatus of an asphalt plant, the aggregate materials are typically contained in a plurality of cold feed bins; each bin containing a particular grade of aggregate or used asphalt-aggregate material. The aggregate materials are then dispensed from the bins by a plurality of variable speed belt feeders, one of which is disposed below each bin. The belt feeders deposit material from each bin onto a conveyor belt for delivery to the mixing apparatus. Varying the speed of the belt feeder varies the rate at which the aggregate material is dispensed from the bins. However, it is necessary to know the actual rate at which aggregate material is dispensed from each bin to the conveyor belt in order to maintain a desired mixture of the various grades of aggregate material. The individual feed rates of the bins and the total feed rate for all the bins must also be accurately known in order to determine the precise quantity of liquid asphalt to be dispensed into the mixing drum to produce the desired asphalt-aggregate product.

U.S. Pat. No. 4,089,509 (hereby incorporated by reference) discloses a system for determining the individual and total feed rates of a plurality of cold feed bins. Each bin is equipped with a variable speed belt feeder whose rate may be controlled by a supervisory control system. The belt feeders dispense the aggregate material onto a conveyor belt disposed below the belt feeders. The conveyor belt transports the aggregate material away from the bins to the mixing drum of a drum mix plant where the aggregate material is processed into the desired finished product. Disposed below the conveyor belt are a plurality of weigh scales. Each scale is disposed slightly downstream of the point at which aggregate material is deposited onto the conveyor belt. As the belt passes over the weigh scales, the scales weigh the belt and the material disposed thereon. Comparing the weight registered by the various weigh scales permits calculation of the weight of material dispensed from the individual bins.

This prior art system has a number of disadvantages and inaccuracies inherent therein. The weight of the conveyor belt is seldom uniform throughout its length. This nonuniformity induces error into the weight measured by weigh scales underlying the conveyor belt. Furthermore, the weight of the conveyor belt will vary greatly, for example, if the belt gets wet from rain. The tension on the belt necessary to run the belt, when compared to the weight of the aggregate material disposed thereon, is great. Thus, small variations in belt tension tend to induce relatively large errors in measured weights of the aggregate material. Moreover, the tension of the belt often varies due to slip of the belt on the end and drive rollers. These variations in tension also induce error into the measured weight of the material on the belt.

SUMMARY OF THE INVENTION

Generally stated, the present invention comprises a system for delivering aggregate material from a feed bin including a weighing means for continuously measuring the weight of the feed bin and aggregate therein, and an emptying means for removing aggregate from the feed bin so as to reduce the weight of the feed bin and its content at a rate corresponding to a desired rate of removal of aggregate from the feed bin. A plurality of such bins may be assembled and coordinated by a control circuit to provide a mixture of different grades of aggregate material in desired proportions.

More particularly, the present invention comprises a plurality of cold feed bins supported above a frame by a plurality of legs. Each leg rests upon a load cell attached to the frame. Each load cell is connected to a control circuit which converts the signals supplied by the load cells to indicate the corresponding weight of the bin and the material contained therein. A variable speed belt feeder disposed below each bin dispenses material from the bin onto a conveyor belt which transports the dispensed material to the input of a mixing drum of a mixing plant. Each belt feeder is connected to the control circuitry so that the speed of the belt feeder may be adjusted in response to the weight of the bin and material contained therein registered at the load cells, the rate of weight loss of the bin and material contained therein corresponding to the rate at which material is being dispensed from the bin.

Accordingly, it is an object of the present invention to provide an improved aggregate delivery apparatus.

It is another object of the present invention to provide aggregate delivery apparatus which is not affected by errors in measured weights of aggregate caused by conveyor belts, or the like, associated with prior art apparatus wherein the aggregate weight is measured after the aggregate is removed from aggregate feed bins.

It is a further object of the present invention to provide aggregate delivery apparatus which will give direct measurement of individual and total rates of dispersing of material from a plurality of cold feed bins.

It is yet another object of the present invention to provide an improved method of delivering aggregate material to an asphalt plant.

These and other objects, features and advantages of the present invention will become apparent from a review of the following detailed description of the disclosed embodiment and the appended drawing and claims.

BRIEF DESCRIPTION OF THE DRAWING

FIG. 1 is a schematic diagram of a disclosed embodiment of the aggregate delivery apparatus of the present invention in combination with a conventional mixing drum of a drum mix plant.

FIG. 2 is a more detailed side view of the aggregate delivery apparatus shown in FIG. 1.

FIG. 3 is an end view of the aggregate delivery apparatus shown in FIG. 2.

FIG. 4 is a detailed view of a load cell of the aggregate delivery apparatus shown in FIG. 2.

FIG. 5 is a cross-sectional view taken along the line 5—5 of the load cell shown in FIG. 4.

DETAILED DESCRIPTION OF THE PREFERRED EMBODIMENT

Referring now to the drawing in which like numbers indicate like elements throughout the several views, it will be seen that there is an aggregate delivery apparatus 10 in accordance with the teachings of the present invention disposed adjacent a conventional mixing drum 12 of a drum mix plant 11. The delivery apparatus 10 comprises four cold feed bins 14, 16, 18, 20 for containing virgin aggregate and/or a combination of virgin aggregate and used asphalt-aggregate material therein. Although the bins 14–20 are described as being for containing aggregate materials, it should be understood that any other dry flowable material that may be delivered from a bin, such as mineral filler often used in an asphalt-aggregate product, may be contained in the bins as well. Furthermore, depending on the aggregate and/or asphalt-aggregate material being produced, any desired number of cold feed bins may be used.

Each cold feed bin 14–20 is supported above a frame 22 by four legs 24 disposed at the corners of the bins. Each leg 24 of the cold feed bins 14–20 rests upon a load cell 26. Each load cell 26 bridges a gap between two support blocks 28, 30 attached to the frame 22 as is best shown by FIG. 4. The legs 24 each include a pair of flanges 25 extending downwardly on either side of the load cell 26, and the flanges are connected by a pin 31 passing beneath the load cell 26 to prevent the leg 24 from being inadvertently lifted off the load cell 26. Excessive horizontal movement of the leg 24 is also prevented, as shown, by the flanges 25 and the blocks 28 and 30. The load cells 26 are connected by leads 32 to a control circuit 34 which may be, for example, a microprocessor, but may also be a less advanced circuit. However, microprocessors are well known in the art and may be designed and programmed by one skilled in the art to provide the particular functions described hereinbelow.

It will be appreciated by those skilled in the art that the weight of the bins 14–20 and any material contained therein is applied to the load cells 26 by the ends of the legs 24. The load cells 26 produce a signal in response to the weight applied to them. The signal is then conveyed to the control circuit 34 through the leads 32. The control circuit 34 converts the signals supplied by a load cell 26 into the corresponding weight resting upon the load cell. The control circuit 34 then sums the weights registered by the four load cells 26 for each cold feed bin 14–20 to obtain the total weight of the bin and the material contained therein. A control circuit within the skill of the art can continuously and independently monitor the weight of each of the cold feed bins 14–20 and the material contained therein. The control circuit 34 may display the weight information on display apparatus (not shown) and/or use the information to control other apparatus as will be explained in detail hereinbelow.

Disposed below each cold feed bin 14–20 is a variable speed belt feeder 36, 38, 40, 42. Belt feeders are known in the art and are typically used for dispensing aggregate material or the like, from a cold feed bin at desired rates. It should be noted that the belt feeders 36–42 are attached to the frame 22, rather than to the cold feed bins 14–20, and therefore do not affect the weight of the bins as applied to the load cells 26.

Each belt feeder 36–42 is connected to the control circuit 34 by a lead 44 (FIG. 1). The control circuit 34 may therefore be designed or programmed to send signals through the leads 44 to each belt feeder 36–42 to independently vary the speed of the belt feeder and thereby vary the rate at which material is dispensed from each cold feed bin 14–20. Techniques for varying the speed of belt feeders in response to an electric signal from a control circuit are within the skill of the art.

Disposed on the frame 22 below the belt feeders 36–42 is a conventional belt conveyor 46 driven by a motor (not shown) in a direction shown by the arrow 47 (FIG. 1). Material dispensed from each cold feed bin 14–20 by the belt feeders 36–42 falls from the belt feeders onto the belt conveyor 46 and is transported by the conveyor away from the bins to an inclined belt conveyor 48. The material falls off the end of the belt conveyor 46 onto the inclined belt conveyor 48 whereupon the material is transported to a chute 50 at the upper end of the drum 12 of the drum mix plant 11. The material falls from the end of the inclined belt conveyor 48 into the chute 50 and is thereby introduced into the interior of the rotating drum for heating, mixing, drying and processing. As the material travels down the length of the rotating drum 12 of the drum mix plant, liquid asphalt dispensed from a dispenser 52 within the drum is combined with the aggregate material to produce a finished asphalt-aggregate product.

The dispenser 52 is connected by pipes to a liquid asphalt metering apparatus 54 which in turn is connected to a reservoir of heated liquid asphalt (not shown). Various types of metering apparatuses responsive to electrical inputs are known in the art and generally function to regulate the rate at which liquid asphalt is supplied to a dispenser within the mixing drum of a drum mix plant to thereby assure proper treatment of the material being processed within the drum.

The metering apparatus 54 is connected to the control circuit 34 by a lead 56, and regulates the rate at which liquid asphalt is dispensed from the dispenser 52, in response to electrical inputs from the control circuit.

The aggregate delivery apparatus 10 is typically operated as follows. Each cold feed bin 14–20 is filled with virgin aggregate material by well known means such as a conventional front end loader. Each bin 14–20 typically contains a different grade of aggregate so as to provide the desired mixture of aggregate material in the final product. For example, bin 14 may contain relatively course aggregate material; with the bins 16–20 containing progressively finer aggregate material. Alternately, one or more of the bins 14–20 may contain pulverized used asphalt-aggregate material which, for example, has been dug up from a roadway.

An input signal corresponding to the desired total rate of production for the drum mix plant, for example, in tons per hour of finished asphalt-aggregate material, is provided to the control circuit 34 by an operator. Input signals corresponding to the desired percentage mixture of each grade of aggregate material contained in each of the bins 14–20 are similarly provided. From this information the desired rate of decrease in the weight of each bin and the contents thereof is calculated by the control circuit 34.

It will be assumed that the cold feed bins 14–20 are all initially filled with aggregate material. It will also be assumed that both of the conveyor belts 46, 48 are running at a constant speed, although it would be possible to regulate the speed of the conveyor belts according to operator input or in response to signals received by the control circuit 34.

The control circuit 34 initially starts the belt feeder 42 dispensing aggregate material from the cold feed bin 20. The aggregate material dispensed from the bin 20 falls onto the moving belt conveyor 46 and is transported toward the mixing drum 12. As aggregate material is being dispensed from the bin 20, the combined weight of the bin and the aggregate material contained therein diminishes. The load cells 26 under the legs 24 of the cold feed bin 20 continually sense the reduced weight resting thereon and transmit the weight reduction to the control circuit 34. Since the control circuit 34 constantly weighs the bin 20 and its contents, the control circuit can calculate the rate at which the weight of the bin 20 and the material contained therein is diminishing. It will be appreciated by those skilled in the art that the absolute value of this calculated rate of weight loss of the bin 20 and the material contained therein is equal to the actual rate, in terms of weight, at which the aggregate material is being dispensed from the bin 20. Thus, the control circuit can constantly monitor the actual rate at which aggregate material is dispensed from the bin 20. The control circuit 34 may then compare the actual rate at which aggregate material is being dispensed from the bin 20 with the desired rate at which the aggregate in that bin is to be dispensed in order to provide the proper proportion in the final product. If the actual rate is less than the desired rate, the control circuit 34 sends a signal through the lead 44 connected to the belt feeder 42 causing the belt feeder 42 to speed up and thereby increase the rate at which aggregate material is dispensed from the bin 20. Conversely, if the actual rate is greater than the desired rate, the control circuit 34 will slow down the belt feeder 42, thereby decreasing the rate at which aggregate material is dispensed from the bin 20. The control circuit 34 similarly continually monitors the actual rate of dispersal of aggregate from the remaining bins 14, 16, 18 and adjusts the speed of the belt feeders 36, 38, 40 so that the actual rate is the same as the desired rate.

It will be appreciated by those skilled in the art that the aggregate material deposited on the moving conveyor belt 46 takes a certain length of time to travel from the position where it is initially deposited on the belt to the position where aggregate material from the next bin is deposited on the belt. Therefore, a time lag may be programmed into the control circuit 34 so that following the initiation of operation of the system or a change in the production rate, the aggregate material from the successive bins 14–18 will not be deposited onto the conveyor belt 46 until the belt has advanced sufficiently so that the material deposited from "upstream" bins is at the point where the aggregate material from the succeeding bins 14–18 is deposited before the delivery from the succeeding bins is begun or altered. In this manner the precise percentage of the aggregate mix may be maintained, even during initial start up of the system and during changes in production rates or composition of the aggregate mix. The necessary time delay will be dependent upon the speed at which the conveyor belt 46 is moving. Therefore, a tachometer 49 for measuring the speed of the belt 46, is provided in conjunction with a roller of the conveyor belt 46. The tachometer is connected to the control circuit 34 by a lead to supply a signal corresponding to the speed of the belt 46 to the control circuit. The required time lag is computed therefrom.

The sum of the individual rates of aggregate dispersal from the bins 14–20 is equal to the total rate at which aggregate is delivered to the mixing drum 12. Based on this information, the control circuit 34 sends a signal to the metering apparatus 54 to adjust the rate of liquid asphalt delivery so that the proper amount of liquid asphalt is dispersed from the dispenser 52 within the mixing drum 12 to properly treat the aggregate material flowing through the drum. In the calculation of the amount of liquid asphalt required, the percentage composition of the aggregate material being processed must be taken into account as well as the total rate. This is especially significant when used asphalt-aggregate material accounts for a portion of the material being introduced to the drum 12, since less new liquid asphalt is required. Methods for determining the required amount of liquid asphalt necessary to properly treat a given amount of aggregate or asphalt-aggregate material of a given percent composition are known in the art. The control circuit 34 can therefore be programmed to perform this function.

It will also be appreciated that there is a time lag between the time aggregate material is deposited on the conveyor belt 46 and the time it reaches the point within the mixing drum where the liquid asphalt is dispensed from the dispenser 52. Therefore, such a time lag can be input to the control circuit 34 so that the rate at which the metering apparatus 54 dispenses liquid asphalt is delayed a sufficient length of time to permit the aggregate material dispensed from the bins 14–20 to reach the point in the drum 12 where the liquid asphalt is dispensed from the dispenser 52. The required time lag can be computed by the control circuit 34 based upon signals supplied from the tachometer on the conveyor belt 46 and a second tachometer (not shown) on the inclined conveyor 48. This control feature assures that liquid asphalt is not wasted when the drum mix plant starts operation, and assures that changes to different production rates or different mix compositions occur quickly and accurately.

As the cold feed bins 14–20 are dispensing aggregate material therefrom, the supply of aggregate material in the bins is typically being replenished by a conventional front end loader, which randomly dumps loads of aggregate into the bins. While aggregate material is being added to a bin, the weight of the bin and the material contained therein increases, disrupting the steady decrease in weight being monitored by the control circuit during operation of the aggregate delivery system. If this condition were not counteracted, the control circuit 34 would attempt to maintain the desired decrease in weight by speeding up the belt feeder in response to the increase in weight, and would deliver too great a proportion of the grade of material contained in the bin being reloaded. In order to avoid having to shut down the apparatus during reloading of the bins, the control circuit 34 includes a means to register any substantial increase in weight for one of the cold feed bins 14-20 and the contents thereof, to store the actual speed of the belt feeder associated with such feed bin, measured immediately prior to the measured increase in weight, and to continue operation of the belt feeder at the stored speed. It has been found that the very short period of constant rate operation during reloading generally does not significantly vary the weight of aggregate delivered compared to that which would have been delivered from the bin had no reloading occurred. After the loading operation has been completed and the weight of the cold feed bin and the material contained therein is decreasing once again because of a net dispensing of material therefrom, the decrease in weight is sensed and transmitted to the control circuit, the stored rate is disregarded, and the belt feeder is regulated in response to the actual rate of dispersal of aggregate material from that bin, as it was prior to reloading of the bin. Thus, it will be appreciated that the cold feed bins 14-20 may be loaded in the conventional manner without adversely affecting the accurate operation of the aggregate delivery apparatus 10 of the present invention.

The control circuit 34 can also be switched to constant rate feed belt operation by a manual input.

It should be understood, of course, that the foregoing relates only to a preferred embodiment of the present invention and that numerous modifications or alterations may be made therein without departing from the spirit and scope of the invention as set forth in the appended claims.

I claim:

1. An apparatus for delivering liquid asphalt from a storage tank and aggregate material from a plurality of feed bins containing various grades of aggregate to a drum mix plant comprising:

individual weighing means for continuously measuring the weight of each of said feed bins and aggregate material contained therein;

individual emptying means for removing aggregate material from each of said feed bins so as to reduce the weight of each of said feed bins and aggregate materials therein measured by said weighing means at a rate corresponding to a desired rate of removal of aggregate material assigned to each of said feed bins;

conveying means for delivering aggregate removed from said feed bins to said drum mix plant;

control means responsive to said weighing means measuring a reduction in the weight of any of said feed bins and aggregate therein at other than said desired rate for said any of said feed bins for adjusting said emptying means to maintain said desired rate of weight reduction from said any of said feed bins; and said control means responsive to said weighing means for delivering liquid asphalt to said drum mix plant at a rate corresponding to the weight and composition of aggregate delivered to said drum mix plant by said conveying means.

2. An apparatus for delivering aggregate material from a feed bin comprising:

weighing means for continuously measuring the weight of said feed bin and aggregate contained therein;

emptying means for removing aggregate material from said feed bin at a variable speed; and control means responsive to said weighing means for varying the speed at which said emptying means removes aggregate from said feed bin, said control means being responsive to a decrease in the weight of said feed bin and aggregate at a rate other than a preselected desired rate to adjust said emptying means to maintain said desired rate, and said control means being responsive to an increase in the weight of said feed bin and aggregate to operate said emptying means at a constant speed equal to its speed immediately preceeding said increase in weight until a decrease in the weight of said feed bin and aggregate is again measured by said weighing means.

* * * * *